Patented July 31, 1945

2,380,479

UNITED STATES PATENT OFFICE 2,380,479 dl-TRYPTOPHANE AND PROCESSES FOR PRODUCING THE SAME

Eric T. Stiller, New York, N. Y.

No Drawing. Application June 6, 1941,
Serial No. 396,829

4 Claims. (Cl. 260—319)

This invention relates to improved processes for the production of dl-tryptophane.

Processes heretofore known for the production of d,l-tryptophane have had the disadvantages, among others, that expensive starting materials are utilized, and low yields are obtained.

I have now discovered that dl-tryptophane may be obtained in greatly increased yields by an improved process which involves the steps illustrated in the following flow sheet:

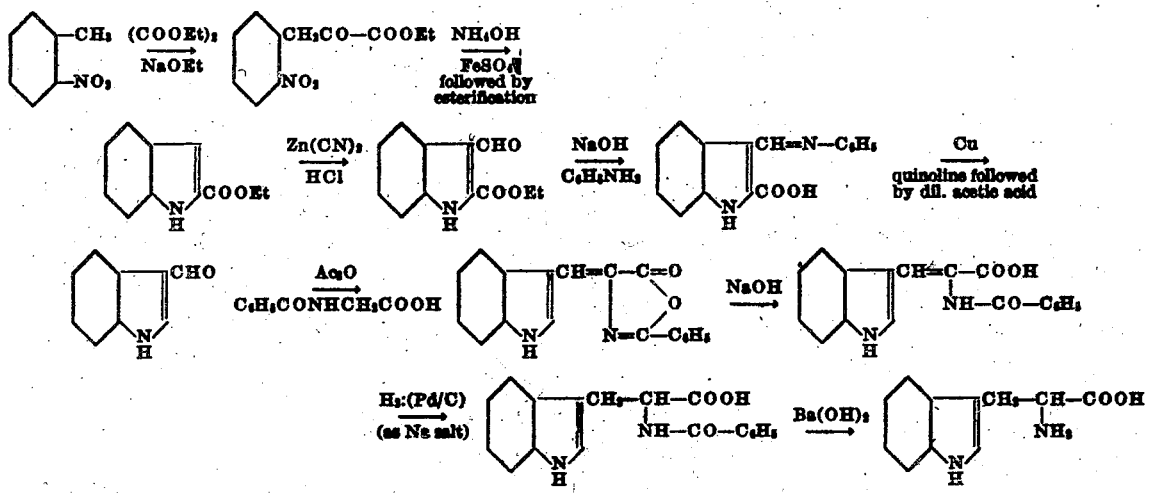

The following example illustrates a method of carrying out the present invention, but it is to be understood that this example is given by way of illustration and not of limitation.

Example

A mixture of 19 gms. of 2-carbethoxy indol (prepared by reacting o-nitro-toluene in alcoholic solution with ethyl oxalate in the presence of sodium ethylate, and treating the reaction product with ammonium hydroxide in the presence of ferrous sulfate followed by esterification), 25 gms. of zinc cyanide and 300 cc. of anhydrous ether is placed in a flask fitted with an inlet tube, a reflux condenser fitted with an outlet tube leading to a sulfuric acid trap, and a stirrer. The mixture is stirred and cooled in an ice salt bath. Dry hydrogen chloride gas is passed through the mixture for 6 and ½ hours. At the end of two hours, the ice bath is substituted by a warm water bath, and the ether allowed to reflux gently. The mixture is then allowed to stand for ½ hour and then the supernatant liquid is decanted from the solid which is washed with ether. The imino compound is boiled with water, and the aldehyde which separates is filtered off and crystallized from dilute alcohol; M. P. 187° C., recrystallized once from chloroform M. P. 188–189° C. The 2-carbethoxy-indol-3-aldehyde is obtained in 93.6% yield.

10 gms. of 2-carboxy-indol-3-aldehyde anil, obtained by treating 2-carbethoxy-indol-3-aldehyde with aniline and sodium hydroxide, are dissolved in 50 cc. of quinoline containing 0.1–0.2 gm. of copper bronze. The mixture is heated at 195° C. in an oil bath until all evolution of carbon dioxide has ceased. During the reaction, the copper disappears in part resulting in the formation of a green-colored solution indicating the formation of a copper compound. Alternatively, the decarboxylation may be accomplished by heating, in quinoline, the copper salt of 2-carboxy-indol-3-aldehyde anil. The copper bronze is removed by filtration, and washed with a mixture of quinoline and alcohol. The combined filtrate and washings are evaporated under reduced pressure, and the dry residue extracted twice with 500 cc. and 400 cc. portions of 1.5% hot acetic acid and filtered hot. The crude indol aldehyde crystallizes from the cold combined filtrates and is filtered off. It is purified by recrystallization from 500 cc. of hot water (norite), M. P. 196–198° C. Further quantities of aldehyde are obtained by working up the mother liquors. Indol-3-aldehyde is obtained in a yield of about 78%.

15 gms. of the azlactone, obtained by treating indol-3-aldehyde with hippuric acid in acetic anhydride, are dissolved in 500 cc. of tenth normal sodium hydroxide by warming. The solution is cooled and 3.75 gms. of palladium charcoal are added. The mixture is hydrogenated at atmospheric pressure until the theoretical amount of hydrogen has been taken up (about eight hours). The catalyst is removed by filtration and washed with a little dilute ammonia. The filtrate is stirred and acidified with dilute hydrochloric acid whereupon a fine crystalline precipitate of dl-benzol tryptophane forms. The precipitate is filtered off and dried in vacuo; M. P. 193-196° C. The benzoyl dl-tryptophane is obtained in a yield of over 89%.

2 gms. of dl-benzoyl tryptophane are refluxed with 100 cc. of 20% barium hydroxide solution until all of the solid has gone into solution (about three hours). The mixture is refluxed for an additional half hour and while the solution is still hot, it is poured into 100 cc. of water. The solution is made acid to Congo red with dilute sulfuric acid, the barium sulfate removed and the filtrate extracted with three 60 cc. portions of ether. The sulfate ion is then removed with barium hydroxide, the barium sulfate filtered off, and the filtrate concentrated to 200 cc. and again adjusted with sulfuric acid and barium hydroxide until no more precipitate forms. The concentration may be continued until the volume reaches 70 cc., when 300 cc. of ethyl alcohol are added. The mixture is placed in the refrigerator, and allowed to stand for about 12 hours, whereupon 0.6 gm. of dl-tryptophane crystallizes out. 0.3 gm. more of the material may be obtained by concentrating the mother liquor to 20 cc., and adding 80 cc. of alcohol. The product melts at 255° C. with decomposition.

Modifications may be made in carrying out the present invention, without departing from the spirit and scope thereof, and I am to be limited only by the appended claims.

I claim:

1. In a process for the production of dl-tryptophane, the step comprising hydrogenating in the presence of palladium a compound selected from the group consisting of α-benzoyl-amino-β-indolyl-acrylic acid and its salts.

2. In a process for the production of dl-tryptophane, the step comprising hydrogenating in the presence of palladium the sodium salt of the α-benzoyl-amino-β-indolyl acrylic acid.

3. In a process for the production of dl-tryptophane, the step comprising hydrogenating in the presence of palladium on charcoal α-benzoyl-amino-β-indolyl acrylic acid.

4. In a process for the production of dl-tryptophane, the steps comprising hydrogenating, in the presence of a palladium catalyst, a compound selected from the group consisting of α-benzoyl-amino-β-indolyl-acrylic acid and salts thereof, recovering benzoyl-dl-tryptophane, and hydrolyzing the latter to produce dl-tryptophane.

ERIC T. STILLER.